Patented July 25, 1950

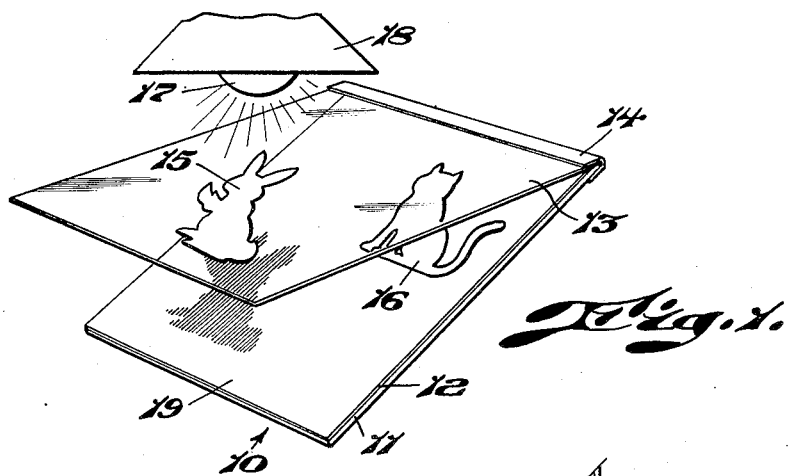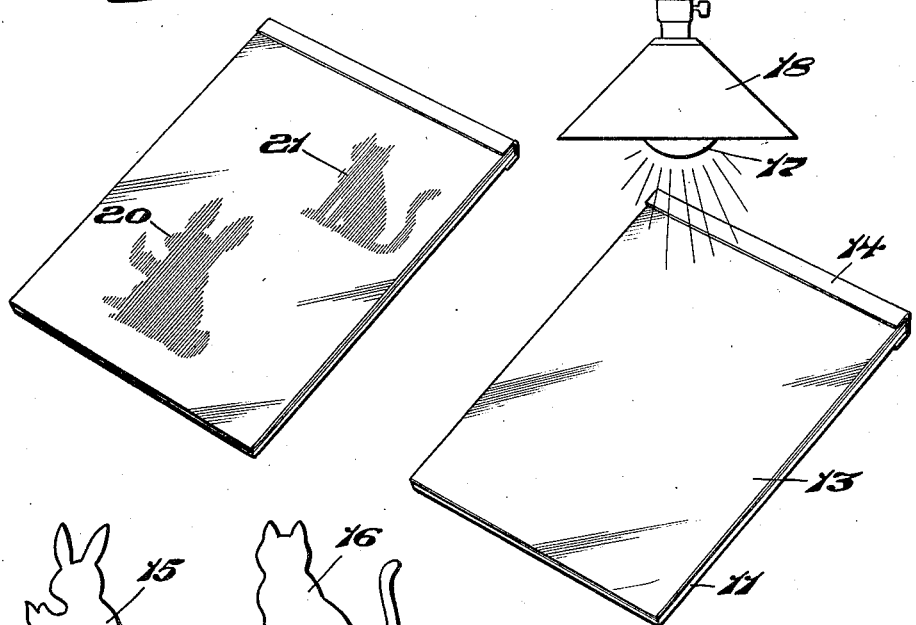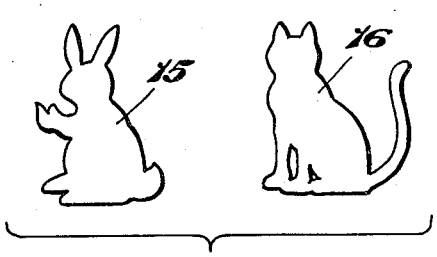

2,516,727

UNITED STATES PATENT OFFICE 2,516,727

LIGHT CHARGEABLE PAD

Robert A. Schultheiss, Attleboro, Mass.

Application September 21, 1948, Serial No. 50,333

1 Claim. (Cl. 35—66)

This invention relates to a sketch or picture pad which may be used in the dark.

One of the objects of this invention is to provide a sketch or picture pad having a surface upon which pencil or crayon markings may be made and erased at will and yet such as may be seen in the dark.

Another object of this invention is to provide a sketch or picture pad which may register silhouettes by exposure to light to activate a part of the surface of the sketch pad while the remainder is shielded so the contrasts may be observed in the dark.

Another object of the invention is to provide a sketch or picture pad which is so constructed that substantially opaque objects or those which will pass but a minimum of light may register their silhouette by exposure to light and which silhouette may be observed in the dark after the object is removed.

Another object of this invention is to provide a device which will be of considerable amusement and educational to children in the dark as well as in the light.

Another object of the invention is to provide a pad which may be continuously used without tearing off and destroying or throwing away any part of the pad.

With these and other objects in view, the invention consists of certain novel features of construction, as will be more fully described and particularly pointed out in the appended claim.

In the accompanying drawings:

Figure 1 is a perspective view of the pad showing the transparent cover as lifted from position and the same as beneath an artificial light;

Figure 2 is a similar view illustrating the effect in the dark of opaque images after the treatment in Figure 1, and the images having been removed from the pad;

Figure 3 is a perspective view illustrating the procedure for erasure of the images as shown in Figure 2; and Figure 4 is a plan view of the images used in Figure 1.

In proceeding with this invention, I provide a base having a luminescent surface formed by application of some of the phosphorescent materials thereto, and then I hinge to one edge of this base a transparent cover which has a surface so provided that a pencil or crayon may be used to mark upon the surface. Also, there is provided some opaque or relatively opaque objects which may be placed either on the outer surface of the cover or between the cover and the base, so that when the cover and base are exposed to light to activate the luminous surface, a part of the surface will be shielded so that no light will get to the same, and thus a silhouette of the image which blocks off the light from the surface will be formed.

With reference to the drawings, 10 designates a base which has a relatively stiff cardboard piece of material 11 upon which there is applied a coating 12 of some of the luminous materials such as the phosphorescent materials, for example, zinc sulphide or cadmium sulphide, such that the surface will glow in the dark after having been exposed to the light.

A cover 13 of transparent or translucent material, such as Celluloid, methyl methacrylate or other suitable resins is provided in a size substantially the same as that of the base and is hinged to the base such as by means of adhesive tape 14 which provides a suitable hinge and extends from the base over the edges of the base and cover. The surface of this cover is so slightly roughened as to receive pencil marks or the like so that one may draw upon this surface, if desired. The surface is erasable by use of a damp cloth, or even a dry cloth in many instances.

Objects which obstruct the light and are substantially opaque such as designated at 15 and 16 are movable over either one or both of these surfaces. In Figure 1, I have shown the object 15 as lying upon the cover surface; whereas, the article 16 is between the base and the cover and lying upon the luminescent surface of the base. When opaque objects are so positioned beneath a light 17 with reflector 18, the surface 19 of the luminescent material will be activated, leaving areas such as 20 and 21 to which the light does not strike, and thus when the light is extinguished and the opaque objects 15 and 16 are removed, these silhouettes will stand out, such as shown in Figure 2 with a luminescent area all about them. If it is desired to erase these silhouettes, it is merely necessary to expose the pad, as shown in Figure 3, to light and the silhouettes which have been provided are extinguished inasmuch as the entire surface then becomes activated by the light and will glow in the dark uniformly all over.

By this arrangement tracings may be made of the silhouettes, as shown in Figure 2, and then the silhouettes may be extinguished by the light so that the tracings on the top surface of the cover 13 are preserved. If it is desired that these be erased, it is merely necessary for a damp cloth to be used to erase such drawings of the silhouettes. Pencil markings may also be placed upon the cover surface of the pad and seen in the dark without the use of light.

I claim:

A picture pad comprising a base having a light chargeable surface of phosphorescent material, a cover for said base movably secured thereto to expose said surface, said cover being of a material capable of passing light therethrough and an opaque body relatively movable over the surface of said base or cover and between the light source and base to provide a silhouette on the base when exposed to light and thereafter removed.

ROBERT A. SCHULTHEISS.

REFERENCES CITED

The following references are of record in the file of this patent:

UNITED STATES PATENTS

| Number | Name | Date |
|---|---|---|
| 1,351,935 | Willis | Sept. 7, 1920 |
| 1,374,875 | Bethke | Apr. 12, 1921 |
| 1,375,816 | Bethke | Apr. 26, 1921 |
| 1,602,356 | Franz | Oct. 5, 1926 |
| 1,658,234 | Field | Feb. 7, 1928 |
| 2,074,855 | Paasche | Mar. 23, 1937 |
| 2,323,521 | De Journette | July 6, 1943 |
| 2,333,597 | Strauss | Nov. 2, 1943 |
| 2,334,766 | Hermann | Nov. 23, 1943 |
| 2,367,608 | Ponnock | Jan. 16, 1945 |
| 2,451,979 | Rosenblum | Oct. 19, 1948 |

FOREIGN PATENTS

| Number | Country | Date |
|---|---|---|
| 172,434 | Germany | June 21, 1906 |